(12) United States Patent
Ramamoorthy et al.

(10) Patent No.: US 9,143,435 B1
(45) Date of Patent: Sep. 22, 2015

(54) MANAGEMENT OF PATHS OF SWITCHES OF DISTRIBUTED COMPUTING SYSTEMS

(71) Applicant: Symantec Corporation, Mountain View, CA (US)

(72) Inventors: Sundar Ramamoorthy, Cupertino, CA (US); Charles Paul Jerian, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 181 days.

(21) Appl. No.: 13/656,273

(22) Filed: Oct. 19, 2012

(51) Int. Cl.
*H04L 12/28* (2006.01)
*H04L 12/721* (2013.01)
*H04L 12/54* (2013.01)
*H04L 12/707* (2013.01)

(52) U.S. Cl.
CPC .......... *H04L 45/123* (2013.01); *H04L 12/5691* (2013.01); *H04L 45/24* (2013.01)

(58) Field of Classification Search
CPC .... H04L 12/5691; H04L 42/123; H04L 45/24
USPC .................. 370/252, 248, 254, 238, 410, 242
See application file for complete search history.

(56) References Cited

U.S. PATENT DOCUMENTS

| | | | | |
|---|---|---|---|---|
| 6,600,724 | B1* | 7/2003 | Cheng | 370/256 |
| 6,711,171 | B1* | 3/2004 | Dobbins et al. | 370/400 |
| 7,231,543 | B2* | 6/2007 | Lee et al. | 714/11 |
| 7,349,427 | B1* | 3/2008 | Canning et al. | 370/466 |
| 7,590,149 | B1* | 9/2009 | Bharali et al. | 370/468 |
| 8,472,342 | B1* | 6/2013 | Bucko et al. | 370/252 |
| 2005/0025059 | A1* | 2/2005 | Rajan et al. | 370/238 |
| 2006/0064506 | A1* | 3/2006 | Mielke | 709/244 |
| 2010/0218236 | A1* | 8/2010 | Hardjono et al. | 726/3 |
| 2012/0155453 | A1* | 6/2012 | Vohra et al. | 370/352 |

* cited by examiner

*Primary Examiner* — Rasheed Gidado
(74) *Attorney, Agent, or Firm* — Campbell Stephenson LLP

(57) ABSTRACT

Various systems and methods for determining and/or using paths through switches of distributed computing system. For example, one method involves accessing switch information by accessing switches using a first network protocol, where the switch information includes parameters of the switches. One or more nodes are configured to access storage devices using the switches, and the node is configured to perform the access using a second network protocol. The method also involves determining one or more paths through the switches, where path is configured to couple the node to the storage devices. The method also involves calculating a path score for at least one path, where the path score can indicate health of the path.

20 Claims, 11 Drawing Sheets

MANAGEMENT OF PATHS OF SWITCHES OF DISTRIBUTED COMPUTING SYSTEMS

FIELD OF THE INVENTION

This application related to distributed computing system. Particularly, this application relates to determining and/or using paths through switches of distributed computing system.

BACKGROUND OF THE INVENTION

As businesses increasingly rely on computers for their daily operations, managing the vast amount of business information generated and processed has become a significant challenge. Most large businesses have a wide variety of application programs managing large volumes of data stored on many different types of storage devices across various types of networks and operating system platforms. These storage devices can include tapes, disks, optical disks, and other types of storage devices and often include a variety of products that can be produced by different vendors. Storage area networks (SANs) including hundreds of storage devices can be used to provide storage for hosts.

SANs offer a variety of topologies and capabilities for interconnecting storage devices, subsystems, and server systems. A variety of interconnect entities, such as switches, hubs, and bridges, can be used to interconnect these components. These varying topologies and capabilities allow storage area networks to be designed and implemented that range from simple to complex configurations. Accompanying this flexibility, however, is the complexity of managing a very large number of devices and allocating storage for numerous application programs sharing these storage devices.

BRIEF DESCRIPTION OF THE DRAWINGS

The embodiments of the present application may be better understood, and its numerous objects, features, and advantages made apparent to those skilled in the art by referencing the accompanying drawings.

Figure 1:
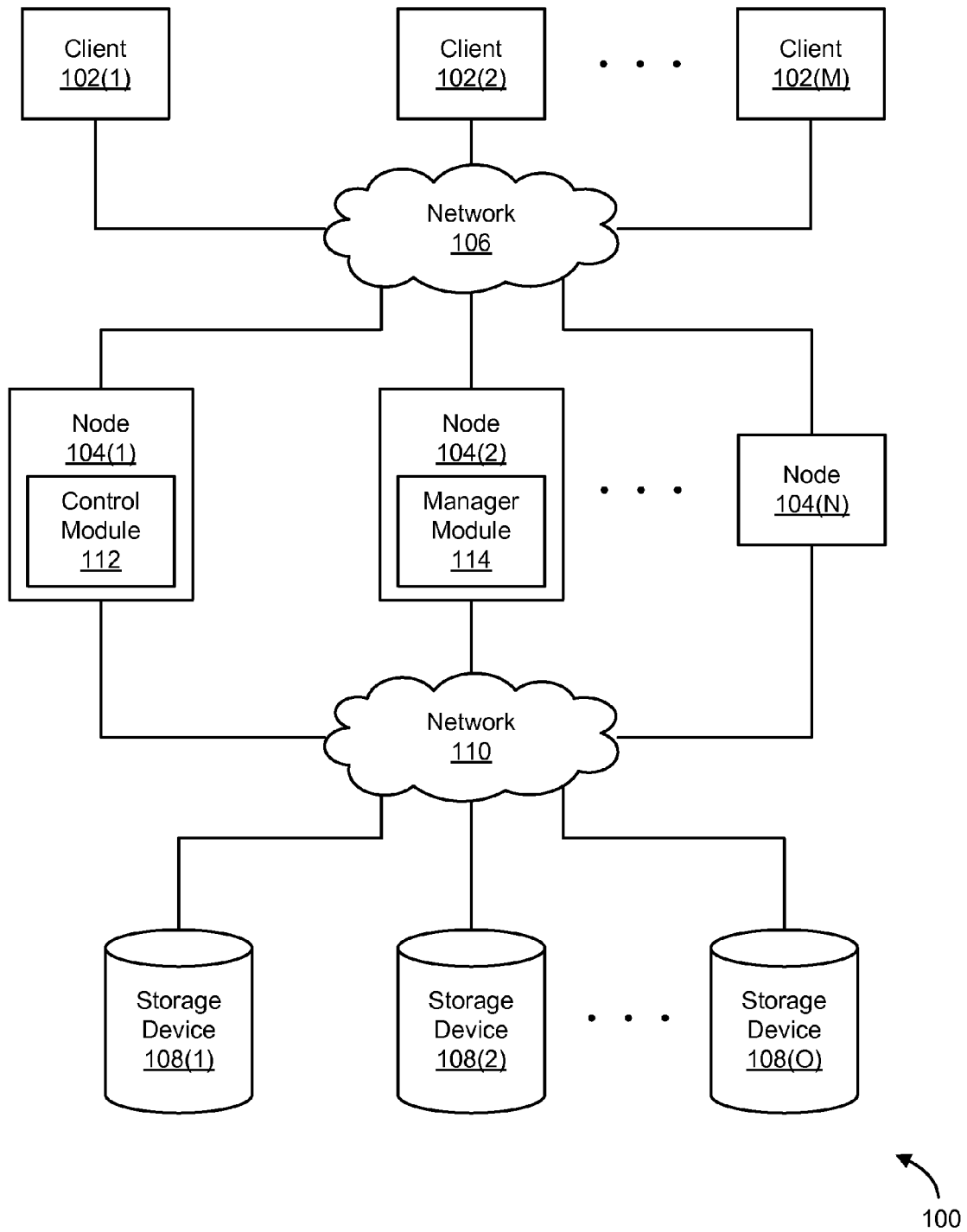
FIG. 1 is a block diagram illustrating a distributed computing system, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Embodiments of the present application are directed to generating and using path scores for paths through switches of a distributed computing system. An example of such a distributed system is shown in FIG. 1. The distributed system allows clients to access storage devices through one or more nodes. The nodes are typically communicatively coupled to the storage devices using a network, such as a storage network. This storage network can include various switches. The nodes can access the storage devices using paths that are created by using these switches. Furthermore, software on the nodes can monitor health of these paths, and can switch paths, as needed. For example, if a path being currently used becomes unreliable, then this software can find another path to use. The software can monitor the switches and/or paths using a separate network protocol from that used to access the distributed storage devices by the nodes.

FIG. 1 is a block diagram 100 of a distributed system, according to some embodiments. As shown, the system includes one or more clients 102(1)-102(M), which are communicatively coupled to one or more nodes 104(1)-104(N) using network 106. Network 106 can include a WAN (Wide Area Network), such as the Internet, one or more LANs (Local Area Networks), and/or one or more SANs (Storage Area Networks). Nodes 104(1)-104(N) access storage devices 108(1)-108(O) using network 110. Network 110 can include a WAN (Wide Area Network), such as the Internet, one or more LANs (Local Area Networks), and/or one or more SANs (Storage Area Networks). In one embodiment, network 106 can be of similar type as network 110. In another embodiment, network 106 can be a LAN or a WAN network, while network 110 is a SAN network.

Nodes 104(1)-104(N) (collectively also referred to as nodes 104) are examples of devices such as workstations, personal computers, servers, PDAs (Personal Digital Assistants), cell phones, network switches, storage array controllers, and the like. Nodes 104 can be communicatively coupled to storage devices 108(1)-108(O) (collectively also referred to as storage devices 108) using network 110. In some embodiments, network 110 includes one or more switches. Nodes 104 can access storage devices 108 one or more paths through the switches of network 110. Control module 112 can determine and/or monitor these paths, such as in the manner described below. It is noted that the switches of network 110 include multiple physical connections, and that paths represent logical connections that are routed between these switches, i.e., over the physical connections.

Control module 112 can determine path scores that indicate health and/or feasibility of each such path. Path health can indicate how well a certain path can facilitate communication between two endpoints of that path. A low path health can indicate that a certain path is not likely to facilitate reliable and/or timely communication, or communication that meets a predefined Quality of Service (QoS), and/or that port(s) of that path are not operating within operating limits (such as because those ports or respective switches have hardware and/or software faults). A high path health can indicate that a certain path is likely to facilitate reliable and/or timely communication, or communication that meets a predefined Quality of Service (QoS), and/or that port(s) of that path are operating within operating limits. Path score can also indicate whether a certain path meets certain criteria for that path. A lower path score can indicate that a given path does not meet such path criteria (such as because switches/connections in that path are too slow and/or too busy). Similarly, a higher path score can indicate that a given path meets such path criteria (such as because switches/connections in that path have enough bandwidth and can process communication fast enough). The path criteria can be calculated, such as by a control module and/or a manager module, as needed for communication. For example, a certain client may require a certain speed and/or dependability of communication with storage devices.

In one embodiment, control module 112 can communicate these path scores to a manager module 114. Manager module 114 can, based at least on the path scores, determine which path each node 104 should use to access storage devices 108. Manager module 114 can implement any one (or more) of a variety of storage access, backup, archiving, and/or redundancy operations that access storage devices 108.

Storage devices 108(1)-108(O) represent various physical and logical storage resources available to consumers within the system. These storage devices can include storage resources that are co-located with (also referred to as local to) consumers (e.g., such storage resources can be part of and/or directly coupled to the consumer's computing device) and/or storage resources that are located remotely from the consumers (e.g., such storage resources can be part of a data center, accessible to the consumers via a Wide Area Network (WAN) such as the Internet). Examples of storage devices can include disk drives, Compact Disc (CD) drives, Digital Versatile Disc (DVD) drives, tape drives, hard drives, and/or the like, and can be arranged using any number of technologies, such as using storage arrays (e.g., a Redundant Array of Independent Disks (RAID). Furthermore, storage devices 108 can be accessed using constructs such as logical objects, such as subdisks, plexes, and/or volumes, among others.

Figure 2:
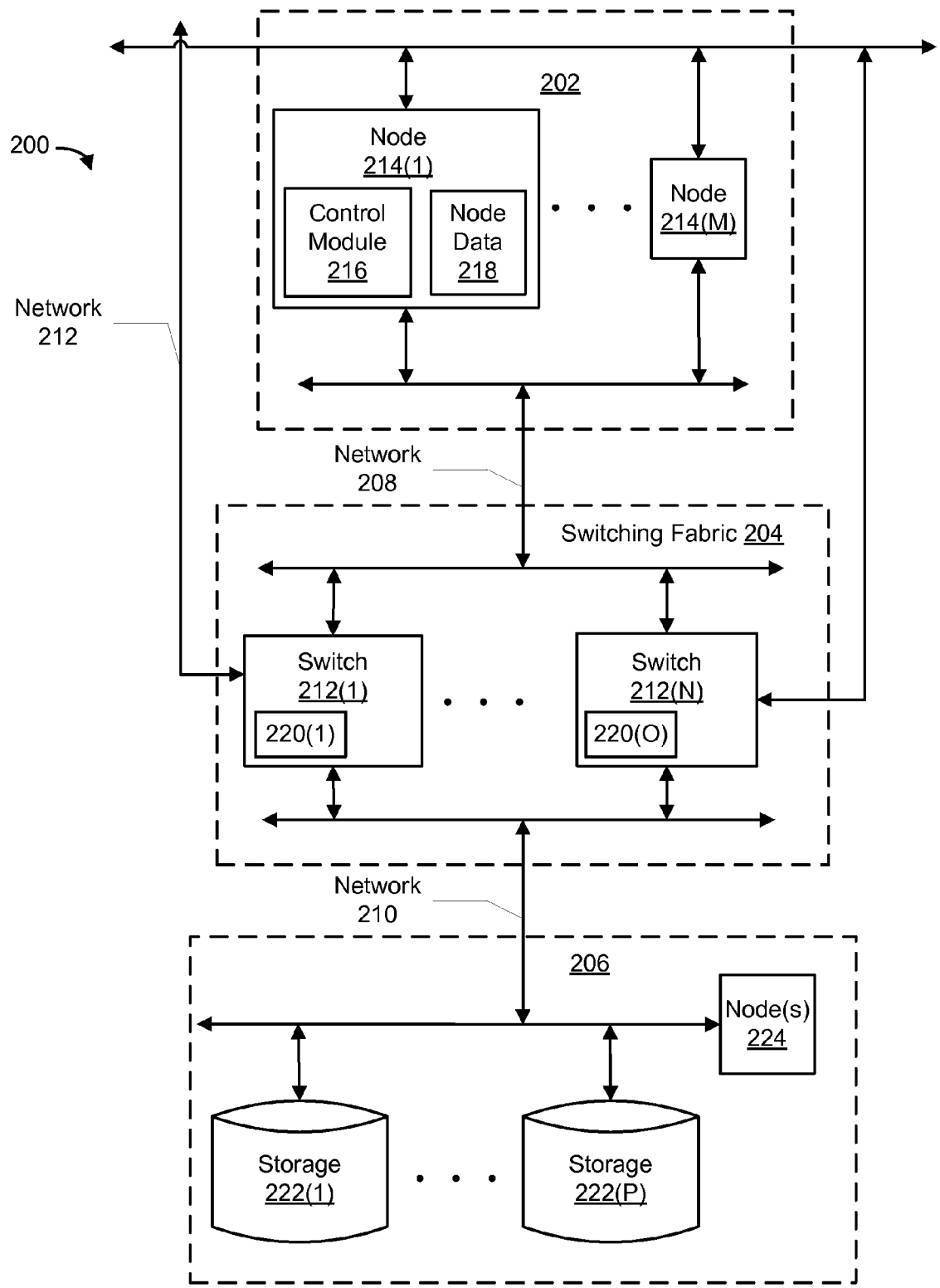
FIG. 2 is a block diagram illustrating a portion of a distributed computing system, according to one embodiment.

FIG. 2 is a block diagram 200 that illustrates a portion of the distributed computing system of FIG. 1, according to some embodiments. FIG. 2 illustrates one or more nodes 202 that access storage devices 206 using switching fabric 204. Nodes 202 access switching fabric 204 using at least two different network protocols, such as a first network protocol over network 208 and a second network protocol over network 212. Nodes 202 can perform accesses of switching fabric 204 using the different network protocols in parallel, i.e., performing both communication of data between nodes 202 and storage devices 206 (using networks 208/210 through switch fabric 204), as well as communication of information between nodes 202 and switches 212(1)-212(N) using network 212. Switches of switching fabric 204 access storage devices 206 using network 210, which can implement a third network protocol. This third network protocol can be same as one of the first and/or second network protocols, or can different from these two protocols.

Nodes 202 include one or more nodes 214(1)-214(M). In one implementation, nodes 202 implement nodes 104(1)-104(N) of FIG. 1, such as node 214(1) implements node 104(1), and so forth. Node 214(1) includes control module 216 that can monitor and/or determine various path(s) through switching fabric 204. Control module 216 can implement control module 112 of FIG. 1. Node data 218 includes various data/information regarding the nodes, switches, and/or paths. In one embodiment, control module 216 can generate path scores for various paths through switching fabric 204, and store these path scores using node data 218. However, such node data can be stored at other node(s) and/or devices, as desired.

Switching fabric 204 includes one or more switches 212 (1)-212(N), as well as various connections there between. Each of switches 212 can include a respective switch manager 220(1)-220(O). Switch managers 220 can perform various communication and/or management duties, such as communicating with nodes 202 and storage devices 206, as well as generating various paths in the respective switches. It is noted that although FIG. 2 shows one level of switches 212(1)-212 (N), various configurations and/or levels of switches can be used, as desired. In some embodiments, each switch 212(1)-212(N) can include one or more ports. Each such port can allow a physical connection that can accept either input signal(s) or output signal(s) from the switch. The switch then can internally route signal connections between ports, thus allowing multiple inputs to access any one of multiple outputs. One such example of a multi-level switch network is illustrated below with reference to FIG. 8. It is noted that switching fabric 204 includes multiple physical connections between switches 212(1)-212(N), and the paths represent logical connections that are routed between these switches, i.e., using the physical connections.

Storage devices 206 include one or more storage devices 222(1)-222(P). Storage devices 222(1)-222(P) can implement storage devices 108 of FIG. 1. In one embodiment, storage devices 206 include one or more nodes 224. Node(s) 224 can perform various communication and/or management duties, such as communicating with switches of switching fabric 204. For example, node(s) 224 can facilitate storage and/or access of data by storage devices 222(1)-222(P), such as according to communication received from node(s) 202 via switching fabric 204. However, in other embodiments, such functionality of node(s) 224 can be implemented by storage devices 222(1)-222(P) themselves.

Nodes 202 can access switches of switching fabric 204 using two or more network protocols. In one embodiment, nodes 202 access switches of switching fabric 204 using a first network protocol, such as over network 208. Nodes 202 can access switches of switching fabric 204 using the first network protocol to issue data access commands, such as to read data from, or write data to, storage devices 206. Switches of switching fabric 204 can route such data access using various paths through switching fabric 204. For example, control module 216 (and/or manager software, such as manager module 114) can communicate with switch managers 220(1)-220(O) to generate path(s) through switching fabric 204 to access storage devices 206. For example, data transmission that uses the first network protocol can include a source node (e.g., node 214(1), or a port of node 214(1)), and a storage device (or a logical memory address that can be translated to a certain location of a storage device). Depending on implementation, this data transmission may also include a specified path through switching fabric 204. Switches of switching fabric 204 then can determine which path to use. In one embodiment, switches of switching fabric 204 use the specified path for facilitating communication between the nodes and the storage devices.

In one embodiment, nodes 202 also access switches of switching fabric 204 using a second network protocol, such as over network 212. Nodes 202 access switches of switching fabric 204 using the second network protocol to perform administrative and managerial functions, such as to obtain path information and/or port information (e.g., switch information) from each switch, and/or to obtain switch parameters that can be used to generate such path information and/or port information. Control module 216 can then determine path scores for paths through switching fabric 204. These path scores can then be used when communicating data transmissions through switches and/or when determining what paths to use.

In one implementation, communication between nodes 202 and switches of switching fabric 204 using the first network protocol can be referred to as in-band communication. The in-band communication is used, for example, to communicate data between nodes and the storage devices. Communication between nodes 202 and switches of switching fabric 204 using the second network protocol can be referred to as out-of-band communication. By using out-of-band communication for configuration and/or administrative functions, nodes 202 do not use the in-band communication that is used for data access between nodes 202 and storage devices 206. For example, node 214(1) can communicate with switches of the switching fabric 204 using Fibre Channel (i.e., in-band communication), while communicating with switches of the switching fabric 204 using Ethernet (i.e., out-of-band communication).

It is noted that in one embodiment, nodes 202 can access switches of switching fabric 204 using the first and second network protocol, where both network protocols use the same network, such as either network 208 or network 212. For example, the first network protocol (i.e., in-band) can use Fibre Channel over Ethernet, or another network protocol different from the second network protocol, using Ethernet (e.g., using network 208). In this example, the second network protocol (i.e., out-of-band) can use TCP/IP, UDP, or another network protocol, using Ethernet (e.g., using network 208).

Figure 3:
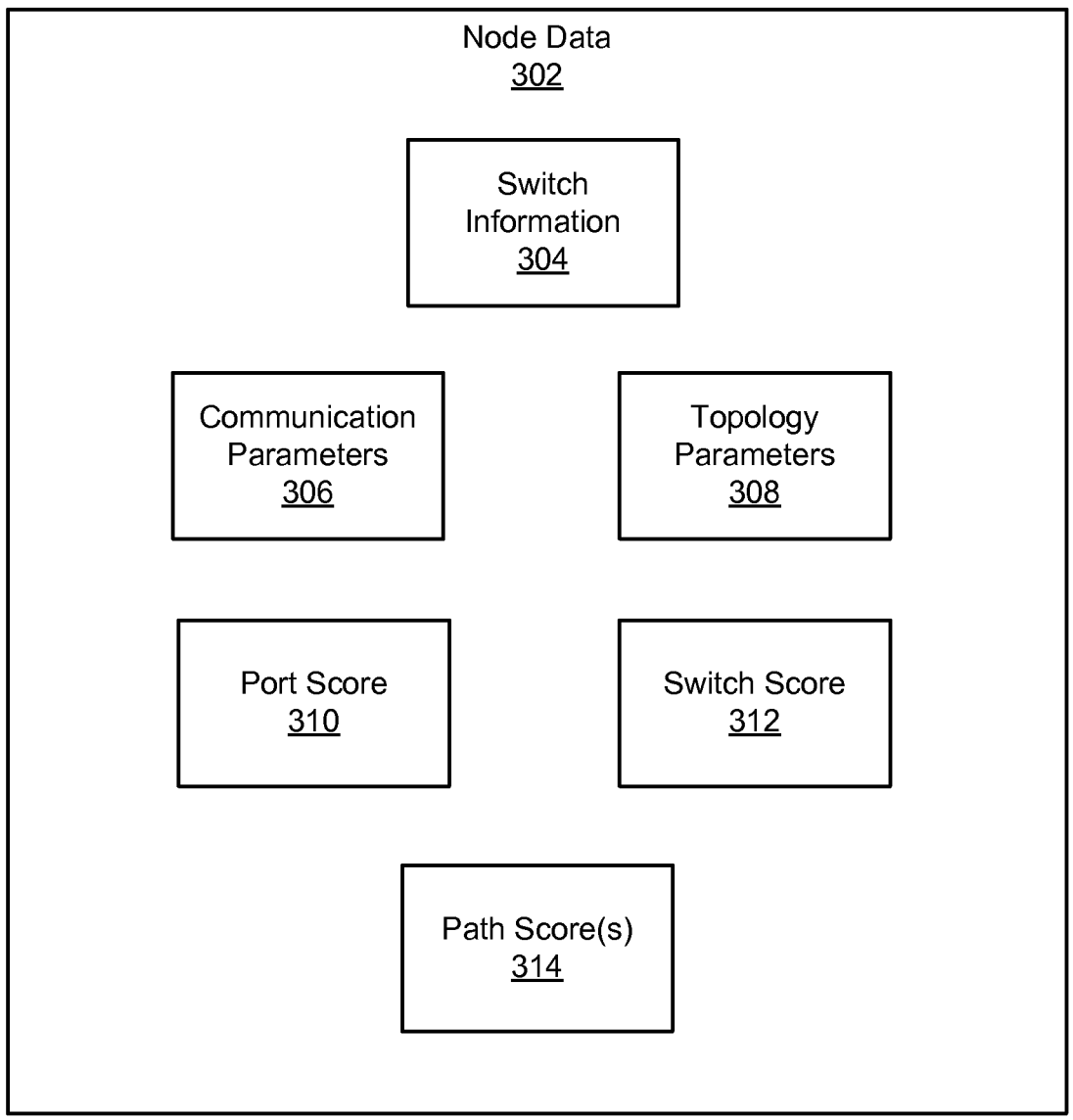
FIG. 3 is a block diagram illustrating example elements of switch information, according to some embodiments.

FIG. 3 is a block diagram 300 of node data 302, according to certain embodiments. As shown, node data 302 includes switch information 304, communication parameters 306, topology parameters 308, port score 310, switch score 312, and path score(s) 314. In one embodiment, switch information 304 can include path information, port information, and/or or another data element(s), as desired. Switch information 304 includes various information regarding switches of the SAN network, e.g., network 110, as used by switches of switching fabric 204 (and optionally by network 208 and/or 210). Switch information 304 can be accessed, such as by reading information from switches of switching fabric 204 using the second network protocol (e.g., using network 212). It is noted that switch information 304, which can include information such as communication information and topology information, and also communication parameters and topology parameters, typically characterizes the first network protocol, e.g., as used by switching fabric 204, to facilitate data access/communication between nodes 202 and storage devices 206. In one embodiment, communication parameters 306 can be calculated for each port of a switch/node and/or switches/nodes themselves, whereas topology parameters 308 can be calculated for each port of a node and/or nodes themselves.

In one embodiment, port scores, switch scores, and/or path scores are calculated only for certain zone(s). For example, if communication between a node (e.g., a port of a node) and a storage device (e.g., a port of that storage device) uses a first zone out of several possible zones on that network (e.g., network implemented by switching fabric 204), then the control module would only calculate communication parameters, topology parameters, port score(s), switch score(s), and/or path score(s) for port(s) and/or switch(es) that are configured for this first zone. The control module can determine the zone for each port/switch either using switch information and/or when communicating with each port/switch.

For example, a control module can access communication information from switches that indicate, e.g., a number of packets sent by each port/switch, a number of packets received by each port/switch, a number of various types of errors on each port/switch, percentage/time of use on each port/switch, etc. Communication parameters 306 include parameters that are calculated (e.g., by a control module) using communication information and optionally using switch information. The control module can then calculate communication parameters 306 for each port/switch, such as communication statistics for each such port. These communication parameters can include link/sync/signal loss errors, invalid words out of range errors, cyclic redundancy check (CRC) errors, temp/power out of spec error, frame discards, port utilization, and/or port throughput, beside others.

The control module can also access topology information from switches that indicate, e.g., which other switches/ports each switch/port is connected to, a number of possible connections for each switch/port, zone information for each switch/port, and/or any path-related information for each switch/port. Zone information can implement Fibre Channel zones, and can indicate one or more zones for which each such port/switch belongs. The control module can then calculate topology parameters 308 for each port of a node (e.g., node 214(1)-214(M)). Topology parameters 308 include parameters that are calculated (e.g., by a control module) using topology information and optionally using switch information. The calculated topology parameters can include whether a connection between a given port of a node and a storage device (e.g., a port of a storage device) is valid, whether zoning is valid for each port, a shortest hop count (e.g., number of connections between ports in a given path) between a given port of a node and a storage device (e.g., a port of a storage device), a number of possible paths between a given port of a node and a storage device (e.g., a port of a storage device), and/or a health of ports in path(s) between a given port of a node and a storage device (e.g., a port of a storage device).

Port score 310 includes score for port(s) of switch(es), such as calculated for each port by a control module. Each such port score can indicate health of a port. Port health can indicate how well a certain port can facilitate communication between the input and output of that port. A low port health can indicate that a certain port is not likely to facilitate reliable and/or timely communication, and/or that port is not operating within operating limits (such as because that port or respective switch has hardware and/or software faults). A high port health can indicate that a certain port is likely to facilitate reliable and/or timely communication, and/or that port is operating within operating limits. The ports can include node ports, switch ports, and/or storage device ports. It is noted that a node port can be also referred to as a Host Bus Adapter (HBA) port. A storage device port can be also referred to as Network Attached Storage (NAS) port.

Switch score 312 includes score for switch(es), such as calculated for each switch by a control module. Switch score can be calculated using switch information and/or port information. For example, a switch score for a certain switch can be calculated using port scores of all (or most of) the ports of that switch. Each such switch score can indicate overall health of a given switch. Switch health can indicate how well a certain switch can facilitate communication between input ports and output ports. A low switch health can indicate that a certain switch is not likely to facilitate reliable and/or timely communication, and/or that switch is not operating within operating limits (such as because that switches has hardware and/or software faults). A high switch health can indicate that a certain switch is likely to facilitate reliable and/or timely communication, and/or that switch that path is operating within operating limits. In one implementation, switch score can be a function, such as an aggregate, or an average, of the port scores of its respective switches.

Path score(s) 314 can indicate health of each path. The path score can be calculated, e.g., by the control module, based on switch score 312 and/or port score 310. Each such path score can indicate the overall health of each path. The control module can then use the path score(s) to determine which paths to use for communication between the nodes and the storage devices. Embodiments of calculating path scores are described below, including with reference to FIG. 3. In one implementation, a path score can be a function, such as an aggregate, or an average, of the port scores of ports included in a respective path. In another implementation, a path score can be a function, such as an aggregate, or an average, of the switch scores of switches included in a respective path.

Figure 4:
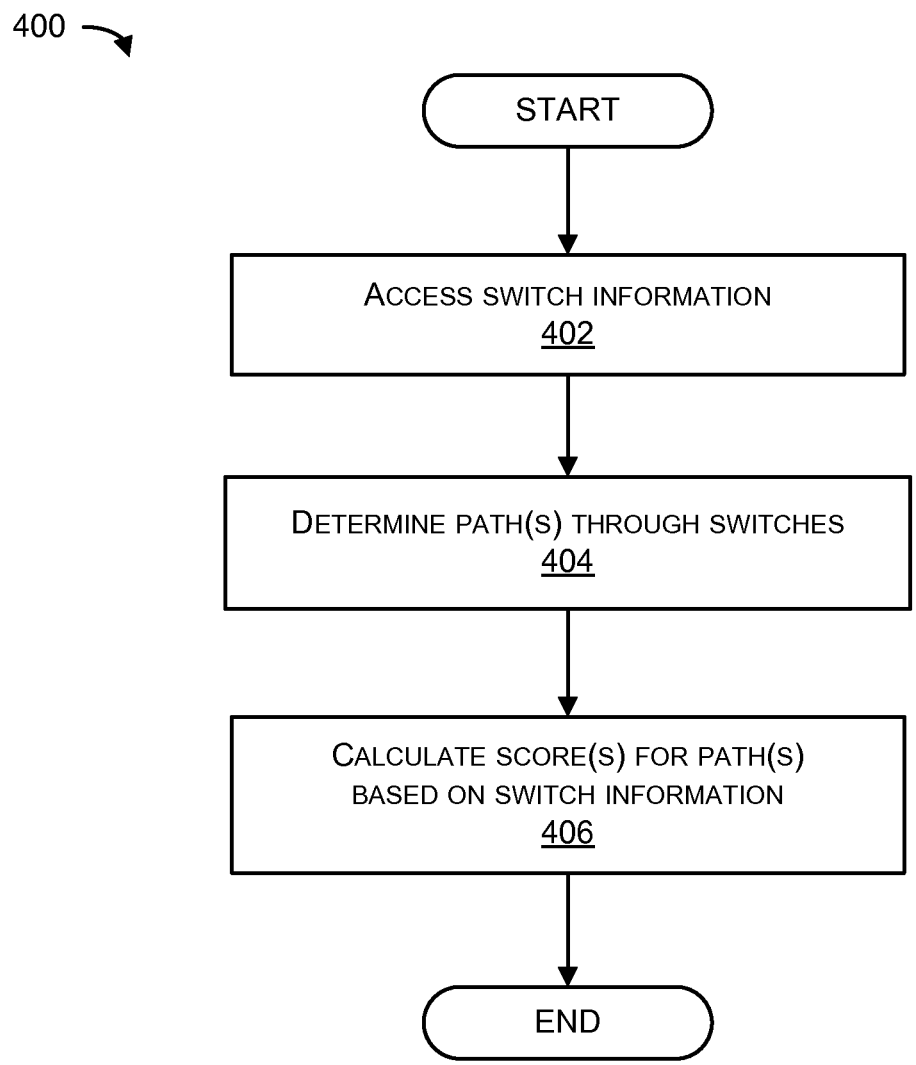
FIG. 4 is a flowchart of a method illustrating calculation of path scores, according to one embodiment.

FIG. 4 is a flowchart of a method 400 for illustrating calculation of path scores, according to some embodiments. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 400 is described with reference to variations of the elements described in connection with FIGS. 1-3. In one implementation, at least a portion of method 400 can be implemented and/or performed by a control module, such as control module 112 and/or 216.

In element 402, a control module accesses switch information, according to some embodiments. The switch information can be accessed from the node(s) and/or switch(es). If at least a portion of the switch information is accessed from the switch(es), the control module can perform this access using a second network protocol (e.g., using network 212). For example, the control module can access some switch information (e.g., cached switch information) from the node(s), and access new and/or changed portions of the switch information from the switches using the second network protocol.

In element 404, the control module determines one or more paths through the switches, according to some embodiments. The control module can perform this determination using one or more techniques based on topology of the switching fabric, such as using a fabric shortest path first (FSPF) algorithm. Such determination can also determine alternate paths in an event of a failure. The control module can also access an existing listing of paths that have been previously determined. It is noted that such listing can be implemented using one or more of various data structures, including lists, queues, graphs, trees, arrays, and/or objects, among others. The control module also can determine new/modified paths through the switches, such as based on the existing listing of paths and/or the accessed switch information. In one implementation, the control module determines path(s) only using port(s) and/or switches that are properly zoned, e.g., are associated with a certain zone. In one implementation, the control module can determine which paths out of possible paths through the switches should have path scores calculated.

For example, there may be 100 paths though the switches between a port of a node and a port of a storage device. The control module can determine those 100 paths by accessing a portion of the switching information and/or other data. The control module can determine that only 10 of those 100 paths have the desired zoning. The control module can then access remaining switch information for ports and/or switches that make up those 10 paths. Once the control module accesses the switch information, the control module can determine whether any of these 10 paths have changed, for example, as a result of one or more switch ports having changed status (e.g., from being fully operational to busy or failed, etc).

In another example, the control module can access a portion of switch information from each switch, such as zone information. Zone information can indicate a zone for each port of that switch. The control module can then determine that only a subset of switch ports have the same zone (or a zone compatible with) zone of the port node and/or storage device port. The control module can then determine 10 paths that are possible through the switches and that have the desired zoning.

In element 406, the control module can calculate scores for the path(s) based on the switch information, according to some embodiments. The control module can, for example, calculate a path score for each path that is determined in element 404. In one embodiment, the control module first calculates a port score of each port in each such path. In another embodiment, the control module first calculates a switch score of each switch in each such path. The control module can then determine the path score based on the port scores and/or switch scores. For example, the control module can aggregate the port score and/or switch scores of each port/switch in the path. The control module can also calculate the path score(s) using another function of port and/or switch scores, such as described above with reference to FIG. 3.

Figure 5:
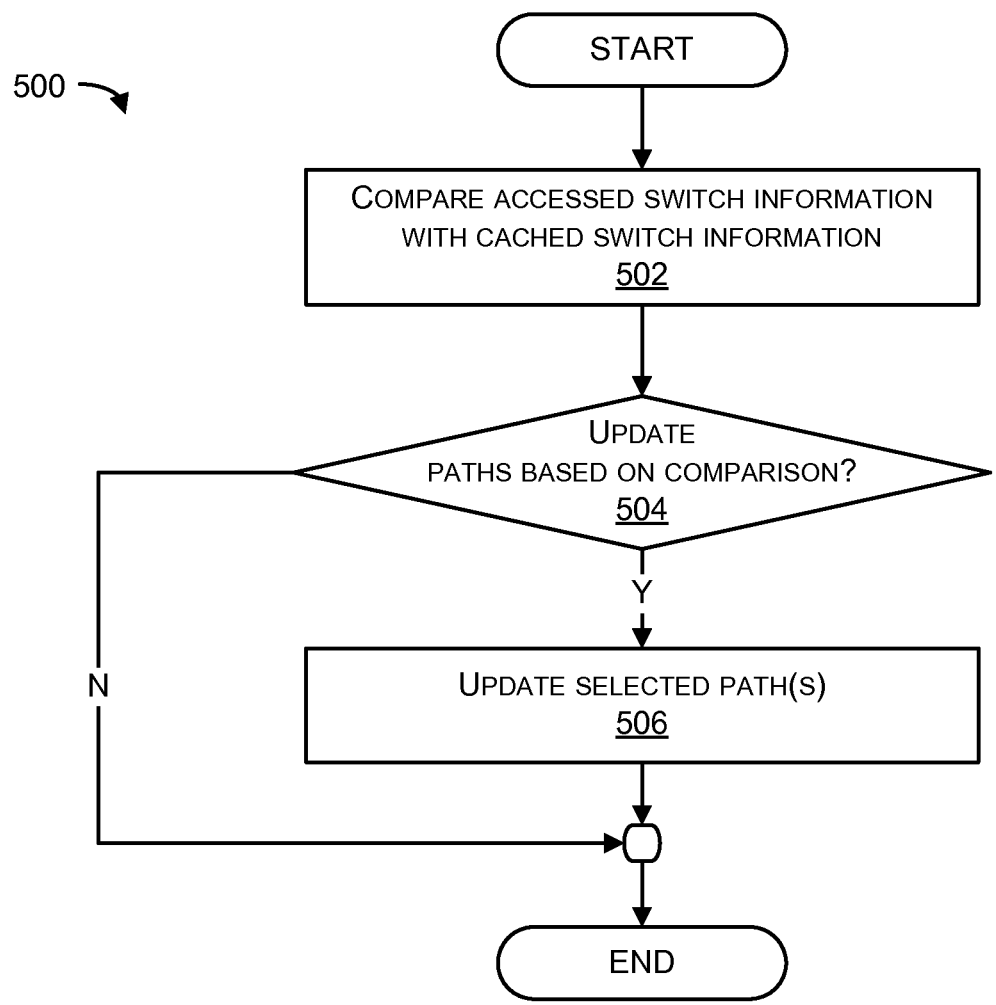
FIG. 5 is a flowchart of a method illustrating path update, according to one embodiment.

FIG. 5 is a flowchart of a method 500 illustrating calculation of path scores, according to some embodiments. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 500 is described with reference to variations of the elements described in connection with FIGS. 1-4. In one implementation, at least a portion of method 500 can be implemented and/or performed by a control module, such as control module 112 and/or 216. In one implementation, method 500 can be performed as part of element 404.

In element 502, a control module compares accessed switch information with cached switch information, according to one or more embodiments. For example, the control module can access cached switch information (such as cached communication information) and compare that cached information with switch information (such updated communication information) that is accessed (such as from the switches). It is noted that not all control modules use cached switch information.

In element 504, the control module determines whether to update paths based on the comparison of element 502, according to one or more embodiments. For example, the control module can make this determination by determining whether any information has changed between the cached switch information and the accessed switch information, such as whether topology information has changed that indicates a new switch/port being added, or that a switch/port has been disabled. If no information has changed, unless the control module receives a command (e.g., from manager software) to update paths, method 500 ends.

If switch information has changed, the control module can then determine whether the changed information indicates that paths should be updated. In one implementation, the control module can first calculate communication and/or topology parameters using the changed information. In one implementation, the control module can determine that only a subset of paths (such as only the paths that have certain topology and/or communication information changed by some amount). In this case, the control module then performs element 506 using this subset of paths. In one implementation, the control module can determine the subset of paths based on the zoning parameters, i.e., the subset of paths that includes certain zoning parameter(s). For example, the control module can determine that only ten paths out of a possible hundred paths have a specified zone parameter. In another implementation, the control module performs element 506 using all of the paths.

In element 506, the control module updates the selected paths, according to one or more embodiments. For example, the control module determines new/modified paths through the switches, such as based on the selected paths (of element 504) and/or the switch information (including the newly accessed switch information and, optionally, the cached switch information). In one implementation, the control module determines path(s) only using port(s) and/or switches that are properly zoned, e.g., are associated with a certain zone. In one implementation, the control module determines which paths should have path scores calculated.

Figure 6:
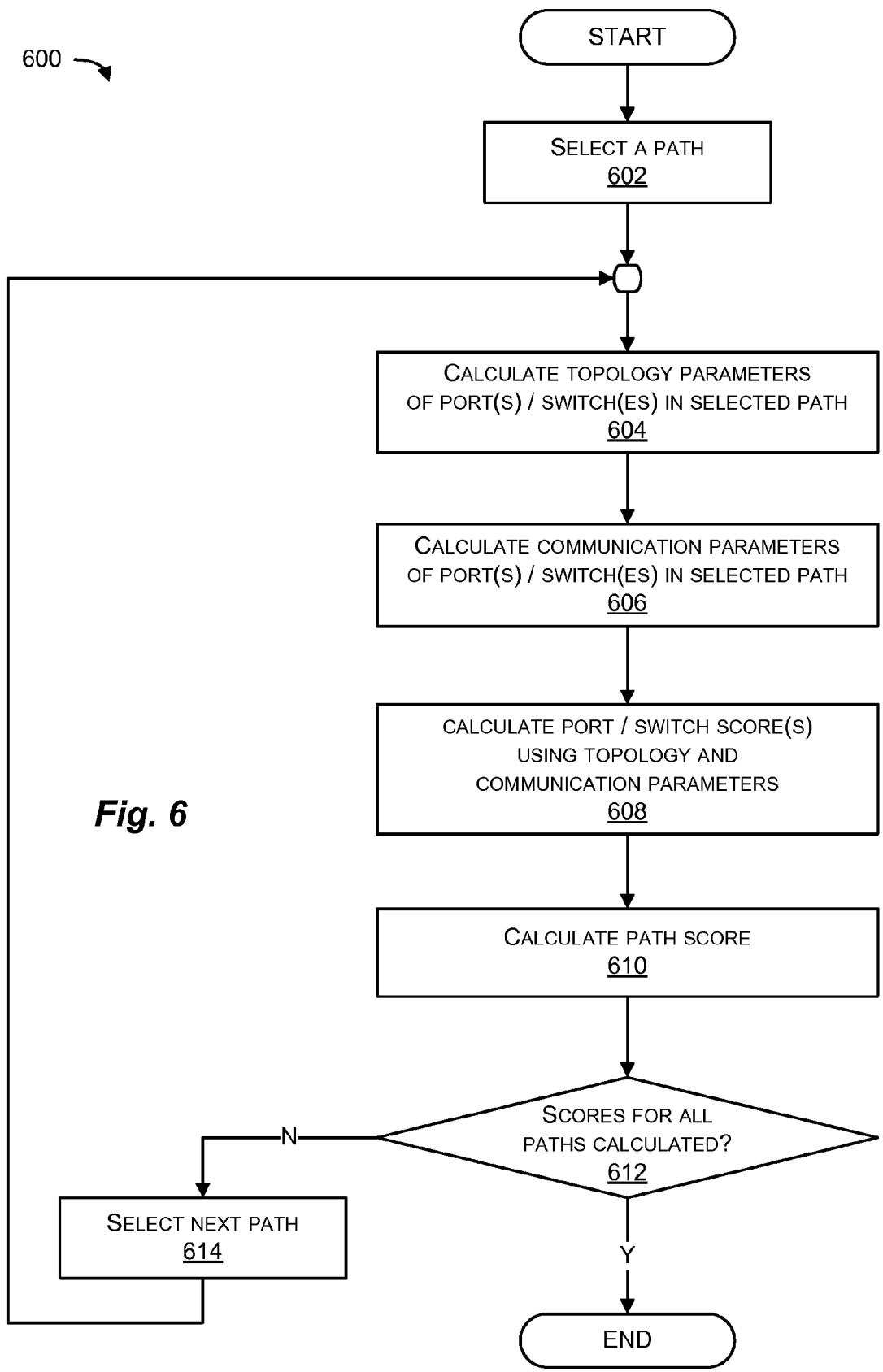
FIG. 6 is a flowchart of a method illustrating calculation of path scores, according to some embodiments.

FIG. 6 is a flowchart of a method 600 illustrating calculation of path scores, according to some embodiments. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 600 is described with reference to variations of the elements described in connection with FIGS. 1-5. In one implementation, at least a portion of method 600 can be implemented and/or performed by a control module, such as control module 112 and/or 216. In one implementation, method 600 can be performed as part of element 406.

In element 602, a control module selects a path, according to one or more embodiments. For example, the control module accesses and selects a first path of from a list of paths available between a node (e.g., a port of that node) and a storage device (e.g., a port of that storage device). The paths can be determined by the control module, such as described above with reference to element 404. Each such path can have two endpoints, a first endpoint at a node (e.g., at a certain port of that node), and a second endpoint at a storage device (e.g., at a certain port of that storage device). The path is routed through one or more switches (e.g., port(s) of switch(es)).

In element 604, the control module calculates topology parameters of port(s) and switch(es) in the selected path, according to one or more embodiments. For example, the control module calculates the topology parameters using topology information, and optionally also using switch information. In one embodiment, the topology parameters are calculated for each path as a whole, i.e., each selected path can have a set of topology parameters. Topology information and topology parameters are described above with reference to FIG. 3.

In element 606, the control module calculates communication parameters of port(s) and switch(es) in the selected path, according to one or more embodiments. For example, the control module calculates the communication parameters using communication information, and optionally also using switch information. In one embodiment, communication parameters are calculated for ports of the node, the storage device, and/or of the switches that are used by the selected path. Communication information and communication parameters are described above with reference to FIG. 3.

In element 608, the control module calculates port and/or switch scores using the topology and communication parameters, according to one or more embodiments. For example, the control module can calculate port scores for the ports of the node, the storage device, and/or of the switches that are used by the selected path. The control module can also/instead calculate switch scores for the switches that include that are used by the selected path. In one embodiment, the control module is configured to calculate the port score(s) and/or the switch score(s) based on the topology parameters, the communication parameters, and/or the switch information. In one embodiment, the control module only calculates the port scores, as a single switch can include ports that are used by various paths, some of which may not be zoned for the selected path.

In element 610, the control module calculates a path score for the selected path, according to one or more embodiments. In one embodiment, the control module calculates the path score using the port and/or switch scores, and optionally also using the switch information. For example, the control module can calculate the path score using the ports of the node, the storage device, and/or of the switches that are used by the selected path. However, in one embodiment, the control module calculates the path score directly based on the topology parameters, the communication parameters, and/or on the switch information, without first calculating the port and/or switch scores for the port(s)/switch(es) in the selected path. In other words, the control module can perform element 610 without performing one or more of elements 604-608.

In element 612, the control module determines whether paths scores are calculated for all of the selected paths, according to one or more embodiments. If there are more paths (e.g., in a path list), then the control module executes element 614 next. Otherwise, if there are no more paths being processed (e.g., in the path list), then method 600 ends.

Figure 7:
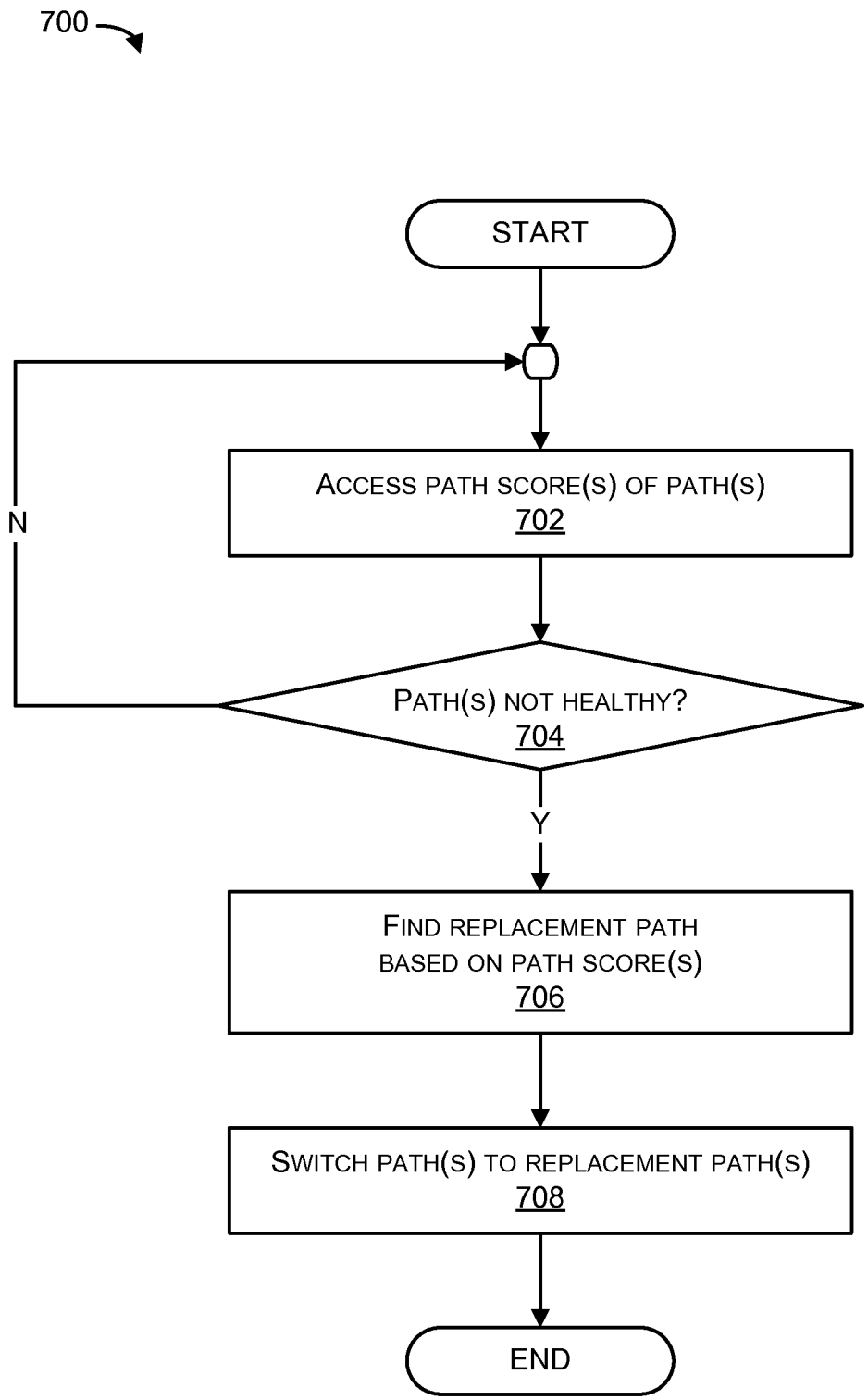
FIG. 7 is a flowchart of a method illustrating switching to replacement path(s) based on path scores, according to one embodiment.

FIG. 7 is a flowchart of a method 700 illustrating calculation of path scores, according to some embodiments. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 700 is described with reference to variations of the elements described in connection with FIGS. 1-3. In one implementation, at least a portion of method 700 can be implemented and/or performed by a manager module, such as manager module 114. It is noted that the nodes can communicate with the storage devices using multiple paths at the same time. Depending on implementation, such manager module can perform method 700 for each path/path score, or for all paths at once. It is noted that the manager module can perform method 700 proactively (e.g., when performing monitoring and/or maintenance of path usages, and/or reactively, e.g., in response to receiving indications that one or more paths are not performing properly).

In element 702, a manager module accesses path score of a path, according to one or more embodiments. For example, with reference to FIG. 1, manager module 114 accesses path score(s) generated by control module 112. In one embodiment, control module 112 can provide the path scores to manager module 114. In another embodiment, manager module 114 can query control module 112 for such path scores. Manager module 114 can also determine (such as by communicating with the control module) which path(s) are being currently used for communication between the nodes and the storage devices. In one embodiment, the manager module can access path score of a path that is not performing well, such as if the manager module determines that communication that uses a certain path is slower than expected (e.g., if the manager module receives indications of various time-outs or delays for that path).

In element 704, the manager module determines whether a path is not healthy, according to one or more embodiments. For example, the manager module determines whether the path(s) being currently used have path score(s) that are at or above a certain threshold. In one embodiment, this threshold can be substantially similar for all of the paths. In another embodiment, each path can have a different threshold. In one embodiment, each threshold can be assigned prior to execution of method 700. In another embodiment, each such threshold can be dynamically calculated for each path to account for differences in communication and/or topology parameters. The manager module can determine which switches are included in each path, and then calculate the threshold based on the communication parameters for the ports/switches in that path. The manager module can also make this threshold calculation based on various parameters of the nodes and/or storage devices in that path. If the manager module determines that the path(s) are healthy, then element 702 is performed again. If the manager module determines that the path(s) (e.g., one of the paths) are not healthy, then the manager module performs element 706.

In element 706, the manager module finds replacement path(s) based on path scores. For example, if the manager module determines that one of the paths being currently used is not healthy, the manager module finds a replacement path for that unhealthy path. The manager module can find such replacement path, for example, by choosing another path that has the same endpoints as the unhealthy path, but uses a different route through the switches, and thus has a path score that indicates better path health. In element 708, the manager module switches path(s) to replacement path(s). For example, the manager module can switch path(s) that are found to be unhealthy (e.g., as determined in element 704) to replacement path(s) (e.g., as determined in element 706). It is noted that the replacement path refers to a different logical path from the logical path being currently used.

Figure 8:
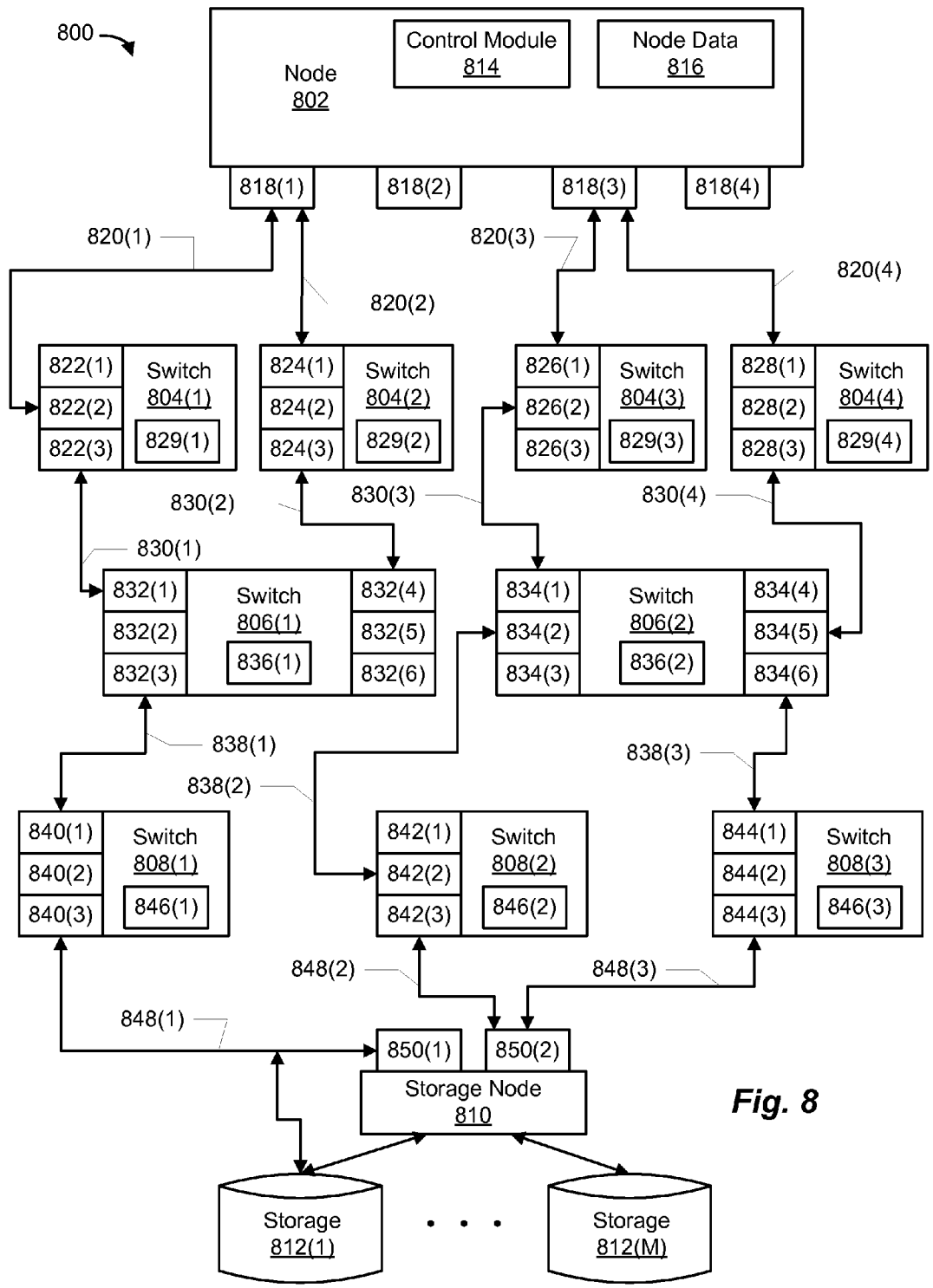
FIG. 8 is a block diagram illustrating example use of paths through multiple switches, according some embodiments.

One example of the operation of the system of FIGS. 1-7 will be explained below with reference to FIG. 8. FIG. 8 is a block diagram 800 that illustrates a portion of the distributed computing system, according to some embodiments. FIG. 8 illustrates a node 802 that accesses storage devices 812(1)-812(M) using switches 804(1)-804(4), 806(1)-806(2), and 808(1)-808(3). Storage devices are accessed using storage node 810. With reference to FIG. 2, node 802 can implement node 214(1); switches 804(1)-804(4), 806(1)-806(2), and 808(1)-808(3) can implement switches 212(1)-212(N); storage devices 812(1)-812(M) can implement storage devices 222(1)-222(P), and storage node 810 can implement node 224.

Node 802 includes a control module 814, node data 816, and node ports 818(1)-818(4). Control module 814 can be an implementation of control module 112 and/or 216. Node data 816 can be an implementation of node data 218 and/or 302. Node 802 communicates with storage devices 812(1)-812(2) by using paths through switches 804(1)-804(4), 806(1)-806(2), and 808(1)-808(3) (also collectively referred to as switches 804, 806, and 808). Node 802 performs this communication using paths by using a first network protocol. As shown, ports 818(1) and 818(3) are configured to use the first network protocol. For example, ports 818(1) and 818(3) are configured to use the Fibre Channel Protocol, and thus are coupled to a Fibre Channel network. In one embodiment, switches 802, 804, and 806, and various connections 820, 830, 838 and 848, between these switches can be referred to as a switching fabric. It is noted that the switching fabric includes multiple physical connections (not shown) between switches 802, 804, and 806, and the various connections 820, 830, 838 and 848 indicate logical connections that are routed between the switches, i.e., over the physical connections. The physical connections of the switching fabric can be implemented using Fibre Channel network(s).

Node 802's control module 814 can access switch information, such as may be stored as part of node data 816 and/or that is stored by switches 804(1)-804(4), 806(1)-806(2), and 808(1)-808(3), using a second network protocol (e.g., a network protocol that is different from that used to communicate with the storage devices using paths through the switches). As shown in FIG. 2, communication between the nodes and the switches using the second network protocol can be performed using a separate network from that utilized to communicate using paths through the switches. For example, ports 818(1) and 818(3) can be configured to communicate using Fibre Channel Protocol (FCP), or another type of a Storage Area Network (SAN) protocol, using a Fibre Channel network (or another type of network). Ports 818(1) and 818(3) are thus configured to facilitate in-band communication between the nodes and the switches. Ports 818(2) and 818(4) can be configured to communicate using TCP/IP, or another type of network protocol, using Ethernet (or another type of network). Ports 818(2) and 818(4) are thus configured to facilitate out-of-band communication between the nodes and the switches. For example, ports 818(2) and 818(4) are coupled to Ethernet network(s).

In one embodiment, both the in-band and the out-of-band network protocols use the same type of network protocol, but use separate networks and separate ports on the respective nodes and switches (though, in fact, such separation can also be achieved using logical constructs, such as virtual private networks or the like). For example, both the in-band and the out-of-band communication could be performed using the FCP network protocol, with the in-band network protocol using a physical network separate from that used by the out-of-band communication. In another embodiment, both the in-band and the out-of-band network protocols use the same network and the same ports on the respective nodes and switches, but use different network protocols. For example, both the in-band and the out-of-band communication could be performed using the same Ethernet network, but with the in-band network protocol using Fibre Channel over Ethernet, and the out-of-band network protocol using TCP/IP.

Switches 804(1)-804(4), 806(1)-806(2), and 808(1)-808(3) implement multiple paths. Switches 804(1)-804(4), 806(1)-806(2), and 808(1)-808(3) include ports 822(1)-822(3), 824(1)-824(3), 826(1)-826(3), 828(1)-828(3), 832(1)-832(6), 834(1)-834(6), 840(1)-840(3), 842(1)-842(3), and 844(1)-844(3), respectively. These ports facilitate connections, using the paths, between switches, nodes, and storage devices. These ports are configured to communicate with ports of the nodes, ports of other switches (or the same switch), and ports of storage devices. In one implementation, switches 804(1)-804(4) and 808(1)-808(3) can be implemented as edge switches, whereas switches 806(1)-806(2) can be implemented as core switches. As shown in FIG. 8, switch ports that use in-band communication are coupled to a SAN network, such as a Fibre Channel network. In addition, each such switch can include additional ports that are configured to perform out-of-band communication, e.g., using Ethernet.

Switches 804(1)-804(4), 806(1)-806(2), and 808(1)-808(3) include switch managers 829(1)-829(4), 836(1)-836(2), and 846(1)-846(3), respectively. These switch managers can perform various management and/or administrative functions for the switches, such as managing connections of ports (e.g., using the first network protocol), communication with nodes (e.g., using the second network protocol), among others. The switch managers can also provide at least portions of connectivity information, topology information, and/or switch information to the control module using the second network protocol. Connections 820(1)-820(4), 830(1)-830(4), 838(1)-838(3), and 848(1)-848(3) can be implemented using a storage area network (SAN), such as Fibre Channel (FC).

Storage devices 812(1)-812(M) communicate with the switches, and thus with the nodes, using storage node 810. Storage node 810 includes ports 850(1) and 850(2). It is noted that in one embodiment, the switches can communicate with the storage device directly, i.e., without using storage node 810. An example of the operation of the system of FIG. 8 will be explained below. In the example below, node 802 initially communicates with storage devices 812(1)-812(2) using a first path and a second path.

Node 802 can communicate with storage devices 812(1) and 812(2) using paths through switches 804, 806, and 808. Control module 814 can calculate multiple paths through switches 804, 806, and 808. A first path might, for example, use connections 820(1), 830(1), 838(1), and 848(1), and facilitate access by port 818(1) of node 802 to port 850(1) used by storage device 812(1). Thus, the first path uses port 822(2) of switch 804(1) as an input port, port 822(3) of switch 804(1) as an output port, port 832(1) of switch 806(1) as an input port, port 832(3) of switch 806(1) as an output port, port 840(1) of switch 808(1) as an input port, and port 840(3) of switch 808(1) as an output port. A first endpoint of the first path is port 818(1) of node 802, whereas a second endpoint of the first path is port 850(1) of storage node 810.

A second path might, for example, use connections 820(3), 830(3), 838(2), and 848(2), and facilitate access by port 818(3) of node 802 to port 850(2) used by storage device 812(2). Thus, the second path uses port 826(1) of switch 804(3) as an input port, port 826(2) of switch 804(3) as an output port, port 834(1) of switch 806(2) as an input port, port 834(2) of switch 806(2) as an output port, port 842(2) of switch 808(2) as an input port, and port 842(3) of switch 808(2) as an output port. A first endpoint of the second path is port 818(3) of node 802, whereas a second endpoint of the first path is port 850(2) of storage node 810.

A third path might, for example, use connections 820(2), 830(2), 838(1), and 848(1), and facilitate access by port 818(1) of node 802 to port 850(1) used by storage device 812(1). The third path uses port 824(1) of switch 804(2) as an input port, port 824(3) of switch 804(2) as an output port, port 832(4) of switch 806(1) as an input port, port 832(3) of switch 806(1) as an output port, port 840(1) of switch 808(1) as an input port, and port 840(3) of switch 808(1) as an output port. A first endpoint of the first path is port 818(1) of node 802, whereas a second endpoint of the first path is port 850(1) of storage node 810. It is noted that the first path and the third path share the same ports of switch 808(1), and the same output port of switch 806(1), and thus share some of the connections (connections 838(1) and 848(1)).

A fourth path might, for example, use connections 820(4), 830(4), 838(4), and 848(3), and facilitate access by port 818(3) of node 802 to port 850(2) used by storage device 812(2). Thus, the second path uses port 828(1) of switch 804(4) as an input port, port 828(3) of switch 804(4) as an output port, port 834(5) of switch 806(2) as an input port, port 834(6) of switch 806(2) as an output port, port 844(1) of switch 808(3) as an input port, and port 844(3) of switch 808(3) as an output port. A first endpoint of the second path is port 818(3) of node 802, whereas a second endpoint of the first path is port 850(2) of storage node 810. With reference to the above example, a path list can include paths one through four.

Control module 814 can access node data 816 and/or switches 804, 806, and 808 using the second network protocol, to access switch information, connectivity information, and/or topology information. Control module 814 can determine, as described with reference to method 400, path scores for the two paths described above, as well as other possible paths through switches 804, 806, and 808 that meet the criteria, such as for proper zoning and having the same endpoints. It is noted that in one embodiment, the control module can also change one or both endpoints of a path, such as when the endpoint port is faulty, or in response to receiving communication from a manager module (not shown) to change the endpoint.

In one scenario, the manager module might, for example, receive an indication that the performance of the first path is below some predefined threshold. The manager module can then access path scores generated by control module 814, e.g., as described with reference to method 700. The manager module can determine that the first path is not healthy. The manager module can find another path, the third path, based on the path scores. The manager module can then switch the first path to the third path. In another scenario, the manager module can perform maintenance and/or monitoring of system 800. During this monitoring, the manager module can determine that the second path is not performing properly. The manager module can then access path scores generated by control module 814. The manager module can find another path, the fourth path, based on the path scores. The manager module can then switch the second path to the fourth path.

Figure 9:
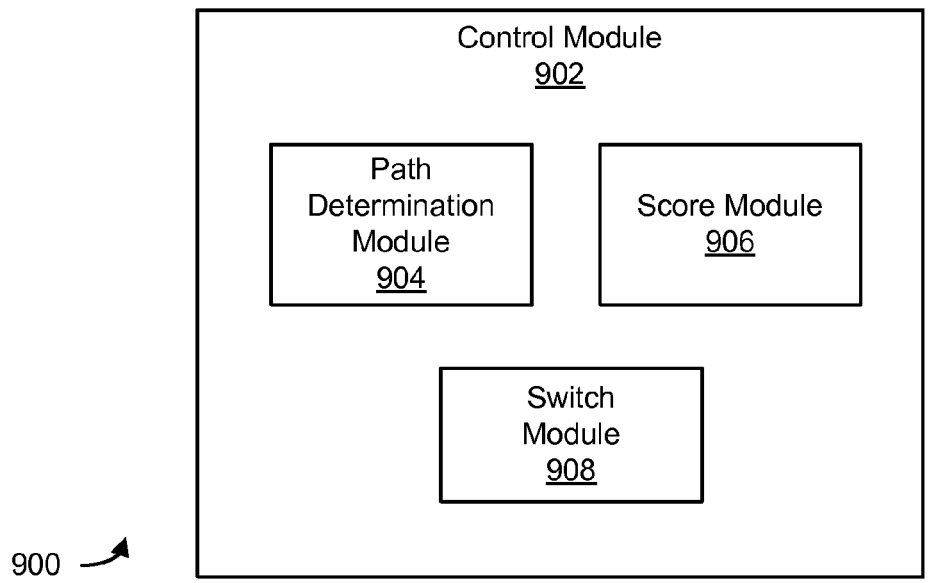
FIG. 9 is a block diagram illustrating an example control module, according to one embodiment.

FIG. 9 is a block diagram 900 of a control module 902, according to one or more embodiments. Control module 902 includes object a path determination module 904, a score module 906, and a switch module 908. Control module 902 can implement control module 112/216, and can implement one or more methods 400-700. Path determination module 904 can determine paths through switches, such as described by element 404. Score module 906 can calculate port, switch, and/or path scores, such as described by elements 406, 608, and/or 610. Switch module 908 can perform switching of paths, such as instructed by a manager module. It is noted that in some embodiments, one or more of elements of control module 902 may not be used. In some embodiments, one or more of elements of control module 902 may be combined, as desired.

Figure 10:
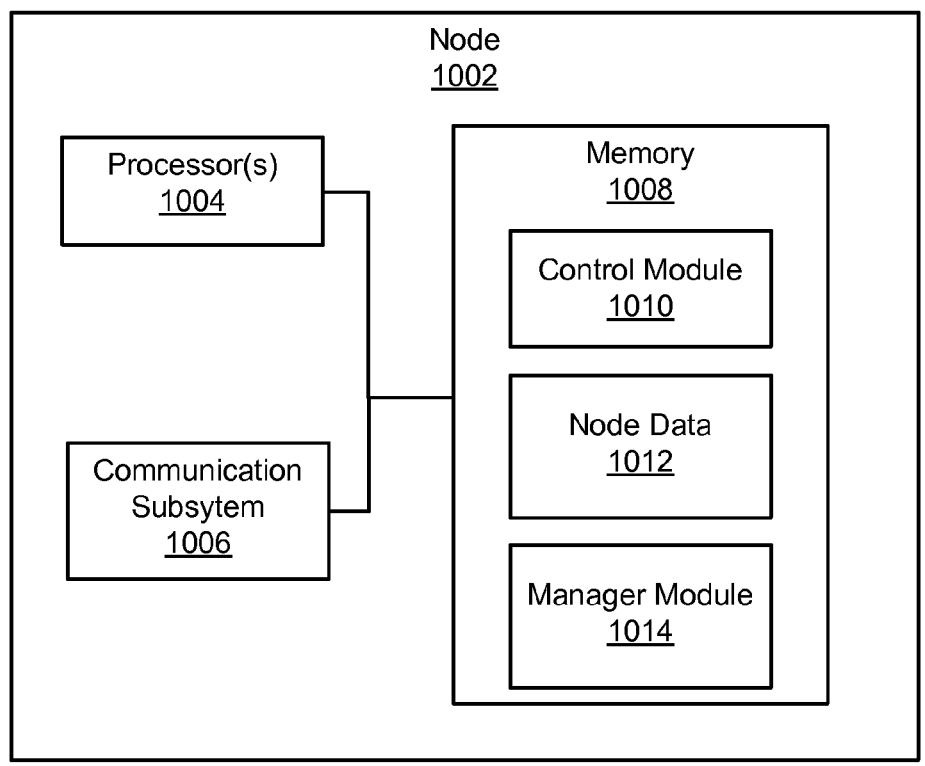
FIG. 10 is a block diagram illustrating example elements of a node, according to one embodiment.

FIG. 10 is a block diagram 1000 of a node 1002, such as node(s) 104(1)-104(N), nodes 214(1)-214(M), node 224, node 802, and/or storage node 810, according to one or more embodiments. Node 1002 includes one or more processor(s) 1004, a communication subsystem 1006, and memory 1008. Memory 1008 can include one or more of operating system (not shown), control module 1010, node data 1012, and control module 1014. Processor(s) 1004 can execute one or more of operating system, control module 1010, and/or manager module 1014. Control module 1002 can implement control module 112, control module 216, and/or control module 902, and can implement one or more of methods 400-700. Communication subsystem 1006 can facilitate communication with other nodes and/or switches over a network, such as by using a first and/or second network protocol. Node data 1012 can implement node data 218, 302, and/or 816. Depending on the implementation, node data 1012 can also implement various data and/or information used by the switches and/or storage nodes. Manager module can implement method 700. It is noted that in some embodiments, one or more of elements of control module 902 may not be used. In some embodiments, one or more of elements of control module 902 may be combined, as desired.

Figure 11:
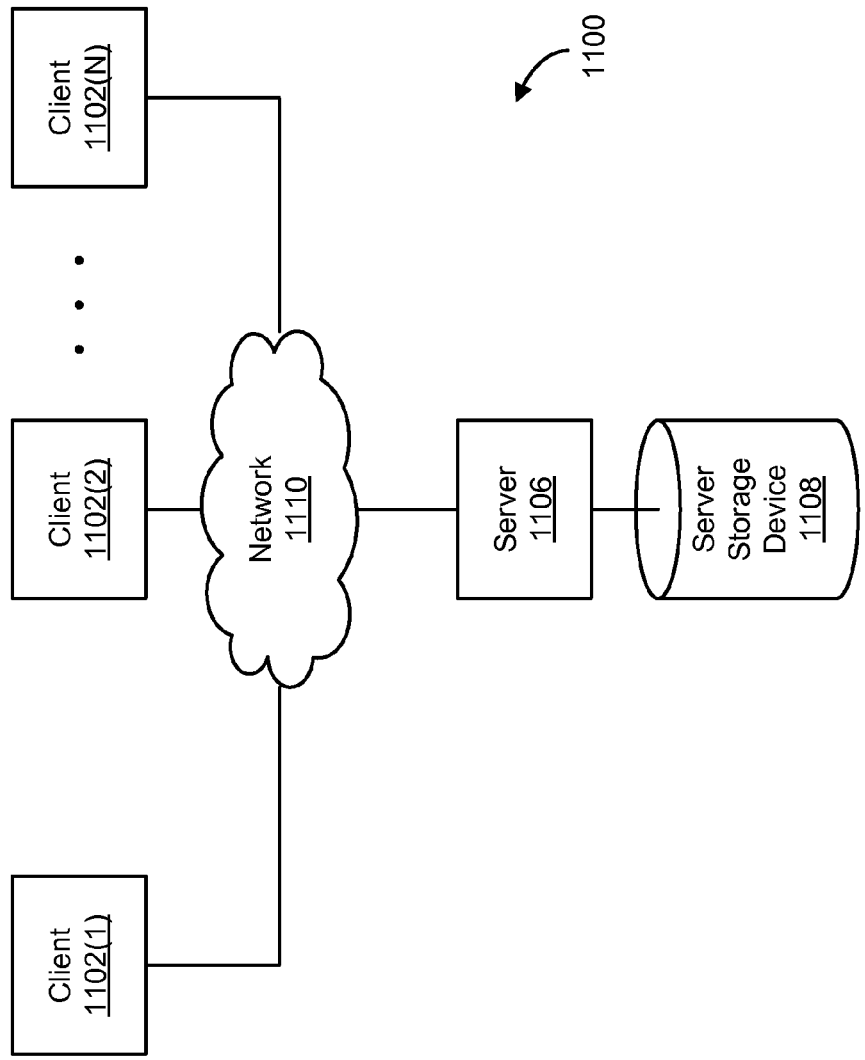
FIG. 11 is a block diagram illustrating a network architecture in which embodiments of the present application can be implemented.

Elements of network architecture can be implemented using different computer systems and networks. An example of one such network environment is described below with reference to FIG. 11. FIG. 11 is a simplified block diagram illustrating a network architecture 1100 in which one or more clients are provided with access to a server via various network connections. As depicted in FIG. 11, clients 1102(1)-(N) are coupled to a network 1110, and so are able to access a server 1106 (which can be used to implement node(s) of FIGS. 1, 2, 9, and/or 10) via network 1810. Other servers (not shown) can be used instead to implement system(s) node(s) of FIGS. 1, 2, 9, and/or 10). A client can be implemented using, for example, a desktop computer, a laptop computer, a workstation, a server, a cell phone, a smart phone, a network-enabled personal digital assistant (PDA), or the like. An example of network 1110, which can be used by clients 1102(1)-(N) to access server 1106, is the Internet. Alternatively, access to server 1106 can be provided by a local area network (LAN) utilizing Ethernet, IEEE 802.11x, or some other communications protocol. As will be appreciated, server 1106 can be accessed by clients coupled directly thereto (not shown).

As also depicted on FIG. 11, server 1106 is coupled to a server storage device 1108, which includes a data volume such as storage 108(1)-108(0), 206, and/or storage 812(1)-812(M), among others. Server storage device 1108 can be implemented as a single storage device or a collection of storage devices. Server storage device 1108 can also be implemented as a storage area network, which couples remote storage devices to a server (e.g., server 1106), such that the remote storage devices appear as locally-attached storage devices to the server's OS, for example.

In light of the present disclosure, those of skill in the art will appreciate that server storage device 1108 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 1100 can include other components such as routers, firewalls and the like that are not germane to the discussion of the present network and will not be discussed further herein. Those of skill in the art will also appreciate that other configurations are possible. For example, clients 1102(1)-(N) can be directly coupled to server storage device 1108 without the user of a server or Internet; server 1106 can be used to implement both the clients and the server; network architecture 1100 can be implemented without the use of clients 1102(1)-(N); and so on.

As an example implementation of network architecture 1100, server 1106, services requests to data generated by clients 1802(1)-(N) to data stored in server storage device 1108. Any of the functionality of the nodes, agents, and/or administration modules can be implemented using one of the other servers in the manner illustrated by FIGS. 4-7.

Figure 12:
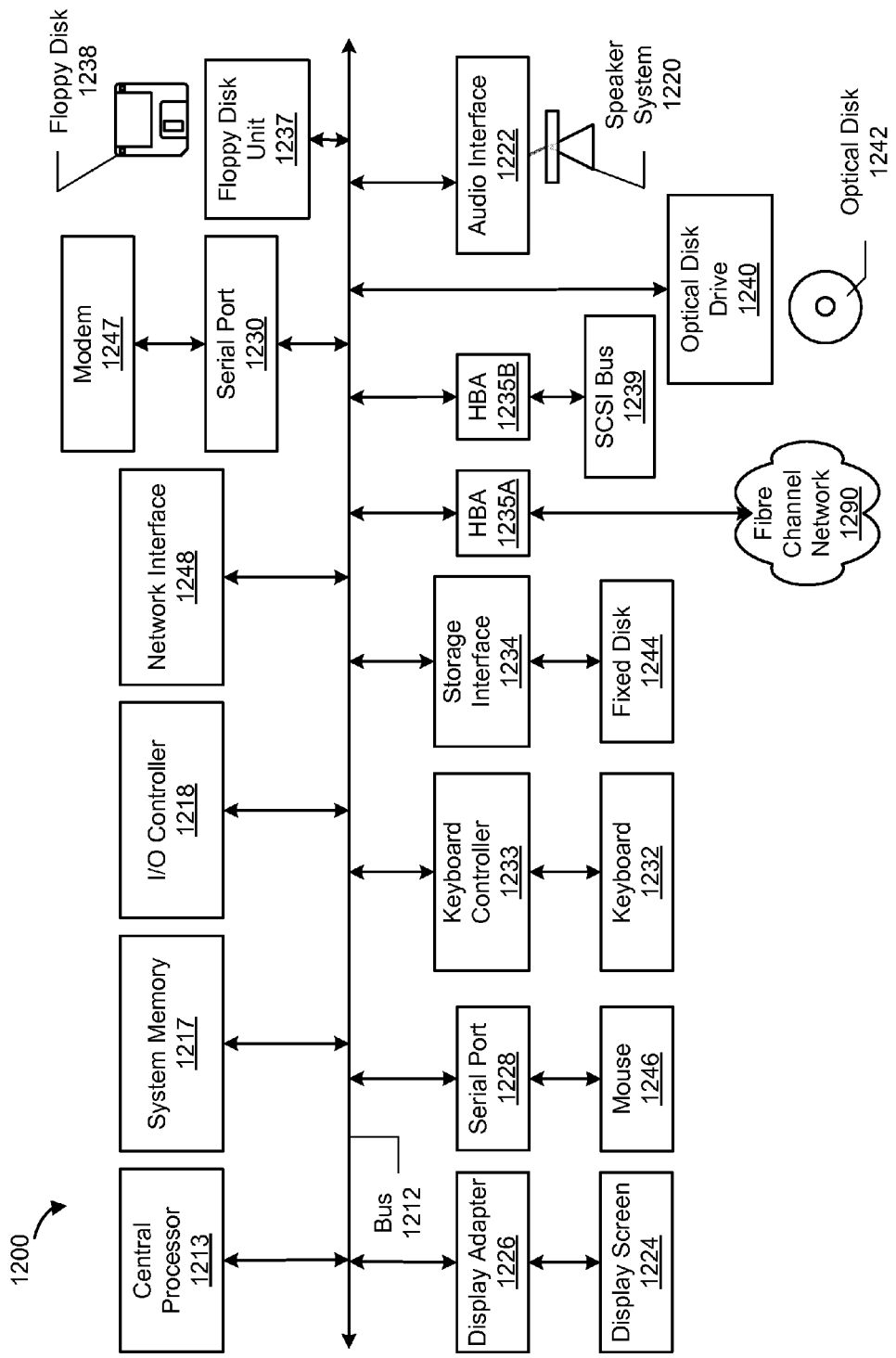
FIG. 12 is a block diagram that illustrates an example of a computer system suitable for implementing embodiments of the present application.

FIG. 12 depicts a block diagram of a computer system 1210 suitable for implementing the present disclosure. Computer system 1210 may be illustrative of various computer systems in the networked system of FIG. 1, such as node(s) and/or storage node(s), among others. Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio output interface 1222, an external device, such as a display screen 1224 via display adapter 1226, serial ports 1228 and 1230, a keyboard 1232 (interfaced with a keyboard controller 1233), a storage interface 1234, a floppy disk drive 1237 operative to receive a floppy disk 1238, a host bus adapter (HBA) interface card 1235A operative to connect with a Fibre Channel network 1290, a host bus adapter (HBA) interface card 1235B operative to connect to a SCSI bus 1239, and an optical disk drive 1240 operative to receive an optical disk 1242. Also included are a mouse 1246 (or other point-and-click device, coupled to bus 1212 via serial port 1228), a modem 1247 (coupled to bus 1212 via serial port 1230), and a network interface 1248 (coupled directly to bus 1212).

Bus 1212 allows data communication between central processor 1214 and system memory 1217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1210 are generally stored on and accessed via a computer readable medium, such as a hard disk drive (e.g., fixed disk 1244), an optical drive (e.g., optical drive 1240), a floppy disk unit 1237, or other storage medium. Additionally, applications can be in the form of electronic signals modulated in accordance with the application and data communication technology when accessed via network modem 1247 or interface 1248.

Storage interface 1234, as with the other storage interfaces of computer system 1210, can connect to a standard computer readable medium for storage and/or retrieval of information, such as a fixed disk drive 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present disclosure.

The devices and subsystems can be interconnected in different ways from that shown in FIG. 12. The operation of a computer system such as that shown in FIG. 12 is readily known in the art and is not discussed in detail in this application. Code for determining and/or using paths through switches of distributed computing system (such as described above with reference to the methods of FIGS. 4-7), etc., to implement the present disclosure can be stored in computer-readable storage media such as one or more of system memory 1217, fixed disk 1244, optical disk 1242, or floppy disk 1238. Memory 1220 is also used for storing temporary variables or other intermediate information during the execution of instructions by the processor 1210. The operating system provided on computer system 1210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
accessing switch information by performing a first access of a plurality of switches using
a first network protocol, wherein
the switch information comprises parameters of at least one of the plurality of switches,
a node is configured to perform a second access of a plurality of storage devices using the plurality of switches, and
the node is configured to perform the second access using a second network protocol;
determining one or more paths through the plurality of switches, wherein
each of the one or more paths is configured to communicatively couple the node to the plurality of storage devices;
calculating a path score for at least one path of the one or more paths, wherein
the calculating the path score uses information received via the first network protocol;
determining whether a first path score for a first path indicates that the first path is unhealthy, wherein
the one or more paths comprises the first path; and
switching from the first path to a replacement path, wherein
the switching comprises determining the replacement path, and
the switching is performed in response to a determination that the first path score indicates the first path is unhealthy.

2. The method of claim 1, wherein
the determining comprises
determining a first subset of switches of the plurality of switches, and
determining the one or more paths using the first subset of switches.

3. The method of claim 1, wherein
the calculating the path score for the at least one path comprises calculating a switch score for each respective switch in the at least one path, and
the calculating the path score is based on one or more switch scores of the each respective switch in the at least one path.

4. The method of claim 1, wherein
the plurality of switches comprises a plurality of ports, and
each port of the plurality of ports is configured to perform the communicatively coupling of the node to the plurality of storage devices.

5. The method of claim 4, wherein
the calculating the path score comprises calculating a port score for each respective port of the at least one path, and
the calculating the path score is based on one or more port scores of each respective port in the at least one path.

6. The method of claim 1, wherein
the first network protocol is different from the second network protocol.

7. The method of claim 1, further comprising:
providing a plurality of path scores to a manager module, wherein
the plurality of path scores comprise the path score,
the manager module is configured to
perform the determining whether the first path score for the first path indicates that the first path is unhealthy, and
perform the switching.

8. The method of claim 1, wherein
the calculating the path score comprises calculating one or more of topology parameters for each port of the at least one path, or communication parameters for the each port, and wherein
the calculating the path score is based on one at least one of
the topology parameters, or
the communication parameters,
of the each port.

9. The method of claim 1, wherein
the calculating the path score comprises
making a comparison of the switch information with cached switch information, and
determining whether to update the path score for the at least one of the one or more paths based on the comparison, and wherein
the calculating the path score is based on the determination.

10. The method of claim 1, wherein
the determining is based on at least a first portion of the switch information, and
the calculating is based on at least a second portion of the switch information.

11. A system, comprising:
one or more processors;
switch information, wherein the switch information characterizes at least one of a plurality of switches;
a control module, configured to be executed using the one or more processors, wherein
the control module is configured to
access switch information by performing a first access of the plurality of switches using a first network protocol, wherein
a node is configured to perform a second access of a plurality of storage devices using the plurality of switches, and
the node is configured to perform the second access using a second network protocol;
determine one or more paths through the plurality of switches, wherein
each of the one or more paths is configured to communicatively couple the node to the plurality of storage devices;
calculate a path score for at least one path of the one or more paths, wherein
the path score is calculated using information received via the first network protocol; and
a manager module, configured to be executed using the one or more processors, wherein
the manager module is configured to
determine whether a first path score for a first path indicates that the first path is unhealthy, wherein
the one or more paths comprises the first path, and
switch from the first path to a replacement path, wherein
the switch comprises determining the replacement path, and
the switch is performed in response to a determination that the first path score indicates the first path is unhealthy.

12. The system of claim 11, wherein
the control module is further configured to
determine a first subset of switches of the plurality of switches, and
determine the one or more paths using the first subset of switches.

13. The system of claim 11, wherein
the first network protocol is different from the second network protocol.

14. The system of claim 11, wherein
the plurality of switches comprises a plurality of ports, and
each port of the plurality of ports is configured to perform the communicatively coupling of the node to the plurality of storage devices.

15. The system of claim 11, wherein
the control module is further configured to
calculate a port score for each respective port of the at least one path, and
wherein
the control module is configured to calculate the path score based on one or more port scores of each respective port in the at least one path.

16. The system of claim 11, wherein
the manager module is further configured to receive a plurality of path scores, wherein
the plurality of path scores comprise the path score.

17. A computer program product comprising:
a plurality of instructions, comprising
a first set of instructions, executable on a computer system, configured to access switch information by performing a first access a plurality of switches using a first network protocol, wherein
the switch information comprises parameters of at least one of the plurality of switches,
a node is configured to perform a second access of a plurality of storage devices using the plurality of switches, and
the node is configured to perform the second access using a second network protocol,
a second set of instructions, executable on the computer system, configured to determine one or more paths through the plurality of switches, wherein
each of the one or more paths is configured to communicatively couple the node to the plurality of storage devices,
a third set of instructions, executable on the computer system, configured to calculate a path score for at least one path of the one or more paths,
wherein
the path score is calculated using information received via the first network protocol, and
a fourth set of instructions, executable on the computer system, configured to
determine whether a first path score for a first path indicates that the first path is unhealthy, wherein
the one or more paths comprises the first path;
switch from the first path to a replacement path, wherein
the switch comprises determining the replacement path, and
the switch is performed in response to a determination that the first path score indicates the first path is unhealthy; and
a non-transitory computer-readable storage medium, wherein the instructions are encoded in the non-transitory computer-readable storage medium.

18. The computer program product of claim 17, wherein
the determining comprises
determining a first subset of switches of the plurality of switches, and
determining the one or more paths using the first subset of switches.

19. The computer program product of claim 17, wherein
the first network protocol is different from the second network protocol.

20. The computer program product of claim 17, wherein
the plurality of switches comprises a plurality of ports,
each port of the plurality of ports is configured to perform the communicatively coupling of the node to the plurality of storage devices,
the calculating the path score comprises calculating a port score for each respective port of the at least one path, and
the calculating the path score is based on one or more port scores of each respective port in the at least one path.

* * * * *

UNITED STATES PATENT AND TRADEMARK OFFICE
CERTIFICATE OF CORRECTION

| | | |
|---|---|---|
| PATENT NO. | : 9,143,435 B1 | Page 1 of 1 |
| APPLICATION NO. | : 13/656273 | |
| DATED | : September 22, 2015 | |
| INVENTOR(S) | : Sundar Ramamoorthy and Charles Paul Jerian | |

It is certified that error appears in the above-identified patent and that said Letters Patent is hereby corrected as shown below:

In the Claims
    Column 18
    Line 42, in Claim 8, replace: "claim 1" with -- claim 4 --

Signed and Sealed this
Thirty-first Day of May, 2016

Michelle K. Lee
*Director of the United States Patent and Trademark Office*